Figure 1:
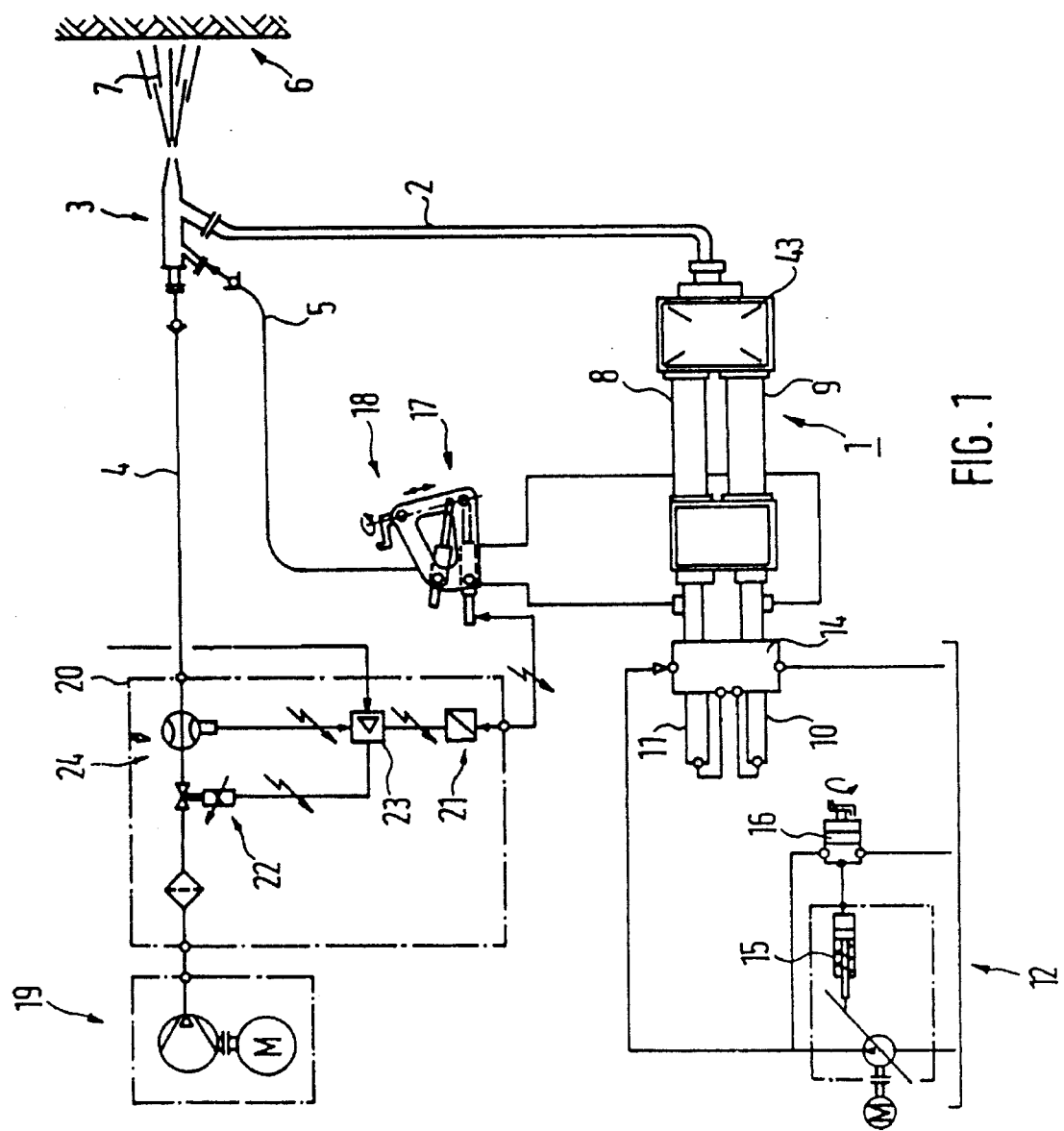

United States Patent [19]

Schmittchen et al.

[11] Patent Number: 5,580,166

[45] Date of Patent: Dec. 3, 1996

[54] CEMENT PUMP FOR A WET SPRAY SYSTEM

[75] Inventors: Gunter Schmittchen, Dortmund; Karl E. von Eckardstein, Unna, both of Germany

[73] Assignee: Friedrich Wilh. Schwing GmbH, Germany

[21] Appl. No.: 13,199

[22] Filed: Jan. 29, 1993

Related U.S. Application Data

[63] Continuation of Ser. No. 639,975, Jan. 11, 1991, abandoned.

[30] Foreign Application Priority Data

Jan. 12, 1990 [DE] Germany ............................ 40 00 720.0
Jan. 31, 1990 [DE] Germany ............................ 40 02 760.0

[51] Int. Cl.[6] .................................. B28C 7/10; B28C 7/12
[52] U.S. Cl. ............................... 366/11; 366/16; 366/20; 366/27; 366/34; 366/35; 366/51
[58] Field of Search .................................. 366/11, 8, 16, 366/20, 27, 34, 35, 37, 51, 150, 151, 152, 160, 161, 162; 239/304

[56] References Cited

U.S. PATENT DOCUMENTS

| | | | |
|---|---|---|---|
| 2,942,860 | 6/1960 | Ridley et al. | 366/11 |
| 2,964,302 | 12/1960 | Tombu | 366/11 |
| 3,017,164 | 1/1962 | Ayers et al. | 366/11 |
| 3,940,119 | 2/1976 | Ridley | 366/11 |
| 4,046,357 | 9/1977 | Twitchell | 366/27 |
| 4,265,858 | 5/1981 | Crum et al. | 366/161 |
| 4,293,227 | 10/1981 | Tanaka et al. | 366/11 |
| 4,298,288 | 11/1981 | Weisbrod | 366/11 |
| 4,585,353 | 4/1986 | Schönhausen | 366/11 |
| 4,614,100 | 9/1986 | Green et al. | 366/152 |

Primary Examiner—David Scherbel
Assistant Examiner—Reginald L. Alexander
Attorney, Agent, or Firm—Price, Heneveld, Cooper, DeWitt & Litton

[57] ABSTRACT

In a concrete pump for wet spraying, in which standard concrete is pumped to a mixing jet, compressed air and if necessary a hardening accelerant are mixed into the concrete stream, which is applied with the jet and compressed; it is the purpose of the invention in its initial version on the one hand to minimize the fine dust yield at the jet, on the other hand to guarantee the availability of the amount of compressed air needed for the wet spraying process, characterized by a regulating section (20) in which the capacity of the concrete pump (1) forms a standard volume for monitoring the amount of compressed air flowing to the mixing jet (3) in such a way that the relationship of the amount of compressed air mixed in per unit of time to the amount of concrete pumped in per unit of time corresponds to a desired value which produces the smallest fine dust yield when the concrete is applied.

11 Claims, 4 Drawing Sheets

CEMENT PUMP FOR A WET SPRAY SYSTEM

This is a continuation of application Ser. No. 07/639,975, filed Jan. 11, 1991, now abandoned.

The invention concerns a concrete pump for the wet spraying process.

The application of spray concrete serves for the immediate securing of exposed mountain surfaces and is used above all as a securing process for the digging of subterranean caves in mining and tunnel building. The invention in this context refers to an execution of this procedure in which the concrete mixture is applied not dry but wet, and which is thus designated as the wet application process. In contrast to the dry application process, this wet application process has the advantage that the concrete applied with the jet has the same characteristics as standard concrete, that is, as concrete ready mixed in a mixer, in which a prescribed ratio of water and solids is strictly adhered to. In the dry spraying process this is not the case, because the mixing water is added only at the spraying jet.

In the framework of this wet spraying process, for which the pump according to this invention is intended, the standard or ready mixed concrete is delivered over any distance to the jet with the help of the concrete pump. In this jet, concrete and compressed air are brought together, whereby the compressed stream of concrete with the compressed air and the jet are brought to the mountain surface, whereupon the concrete is broken into particles which are hurled by the compressed air onto the mountain surfaces. Here generally a hardening accelerant is added, that is, mixed into the concrete flow for the purpose of achieving a high degree of solidity early and in the end result. This can occur in various ways. Generally a separate dosing pump is used, which preferably introduces the liquid hardening accelerant at the jet in the desired quantity.

In the spraying of concrete inevitably dusts are produced that can enter the lungs; among these are fine dusts with a particle size to 5 µm (micrometers) and particle substance of crystalline silicon oxide; quartz dusts with particle diameters of 1 to 2 µm (micrometers) are considered particularly dangerous. Fine dusts are the cause of the occupational disease silicosis, regarded as incurable, and must therefore be avoided. That is particularly difficult to achieve under conditions using compressed air. This necessity has come to light since we know that it is not true, as speculated on in the literature, that no fine dust harmful to the lungs is released between the jet and the mountain in the wet spraying process. Newer investigations demonstrate rather that in the wet spraying process, whether the concrete is in a thick or a thin stream, an increase of fine dust proportional to the water added occurs at the jet (Bergbau 6/88 pp. 243, 248).

It is known that equipment needed for the wet spraying process is composed of separately usable components, of which only the spraying jet and possibly the additive and dosing arrangement of the hardening accelerant are built specifically for the process. That means that the provision for compressed air comes from a compressed air line provided by a central compressed air producer, which in mining and tunnel building is generally set up a great distance from the work site and hence from the concrete pump. In mobile operations for the wet spraying process, decentralized, mostly transportable compressors are used. Generally therefore the compressed air is available at the entrance of the wet spraying operation with pre-set pressure of about 4 bars, for example, and in various quantities but in any case in sufficient supply for the maximal amount of concrete for the concrete pump. Many times, however, the capacity of the compressor far exceeds that needed for the maximal amount of concrete prescribed for the concrete pump, because the compressor is also used for purposes other than wet spraying.

The concrete stream is then generally determined by the capacity of the concrete pump, which is adjustable but firmly set. The workers strive to operate the equipment with a great excess of compressed air. This has various causes, however, for the jet operator among others the advantage of being sure to reach the mountain surface with the concrete particles; the rebounding of concrete that is increased by the massive stream of compressed air is generally not paid attention to. Of course, the jet operator has to be careful to use the shut-off valves in observing the various conditions for the application of the concrete at the crest and on the faces.

It has now been proven that with a given portion of water, the fine dust is smaller the smaller the amount of compressed air added to a given volume of concrete per unit of time.

It is the task of the invention, on this foundation, to create a concrete pump that on one hand minimizes the fine dust, on the other hand ensuring that the quantities of compressed air necessary for wet spraying are available at the jet at any moment.

An initial solution of this task results in a concrete pump comprising a regulator for monitoring the amount of concrete pumped by the concrete pump and regulating the amount of compressed air which is used for spraying the concrete, so that a relationship of the amount of compressed air mixed in per unit of time to the amount of concrete pumped per unit of time is a desired value which minimizes production of dust during concrete application. Further characteristics of the invention are objects of the subclaims.

According to the theory of the invention, the amount of compressed air available at the jet is regulated so that this amount corresponds at any given moment to the amount of concrete supplied, whereby the desired value of the amount of compressed air is prescribed in such a way as to correspond to the achievable minimal value of fine dust at the jet, which is identical to the smallest amount of compressed air that is required technically for the concrete. From here one can assume that the relationship of the amount of compressed air in $m_3$ per minute to the amount of concrete in $m^{-3}$ per hour is about 1 to 1; this rule of thumb can be improved still more through more exact measurements.

The invention has the advantage of preventing the workers from operating the wet spraying equipment at an unjustifiably high volume of compressed air and endangering themselves because of an excess of fine dust. Since, according to the invention, the regulating section is installed on the concrete pump, the workers are also unable to change the volume of compressed air available at the jet by arbitrarily manipulating the compressor, particularly if it is installed in a decentralized location. In this way a supply of compressed air optimally suited for the concrete stream is achieved, sufficient for the application and compression of the concrete on the mountain surface, yet this avoids minimal endangering of the workers through excessive fine dust.

Measurement of the amount of concrete pumped, or the standard volume, can result from a magnetic inductive flow measurement of the pumped concrete. Such measuring procedures however assume extra ordinarily costly provisions, which lead to an appreciable increase in the cost of the concrete pump and hence of the wet spraying process. However, since wet spray concrete pumps utilize auxiliary systems, discussed further below, a measure of the standard volume may be derived indirectly via auxiliaries which correlate to the operating capacities of the concrete pump.

Accordingly, in the depicted use of a two-cylinder piston concrete pump, counting the shifting procedures of a slide (that serves to steer the concrete supply) provides a measure for the concrete pushed through.

The slide is necessary for directing the reciprocal drawing in of the concrete from a filling container and the reciprocally following moving of the cylinders into the concrete delivery system. This execution of the invention is particularly simple if the slide is activated by a doubly active linear impulse, for example, a hydraulic cylinder. The counting of the shifts can be accomplished by an inductive transmitter or electromechanically.

Since the volumetric degree of efficiency of two-cylinder piston concrete pumps is essentially independent of the amount of concrete supplied, the number of piston strokes of the cylinders per unit of time offer an exact measure of the amounts of concrete pushed through at any one time.

In their modern forms, two-cylinder piston concrete pumps are generally hydraulically powered. Thereby each concrete delivery cylinder has its own hydraulic drive cylinder. This offers the possibility of using as standard volume the capacity of the hydraulic drive medium of the concrete pump per unit of time, that is, the hydraulic capacity pushed through the drive cylinders. This execution of the invention is given in claim 5.

In the case of using a hydraulic pressure producer connected directly to the concrete pump, for example, in the form of an "oblique plate" piston pump, in this execution of the invention, either the rotation angle or the steering pressure needed to change the rotation angle can be used for the determination of the standard volume.

Another possibility for the determination of the standard volume presents itself when, in the preferred application of the concrete pump according to the invention, a hardening accelerant is mixed into the concrete stream. Then one or more auxiliaries can be used to form the standard volume, derived from the dosing installation, and from which the standard volume can be determined. Hereby an inductive transmitter or tachogenerator can deliver the standard volume. In these auxiliaries it can be the recording of the rotation number of a motor driving the dosing pump or the number of strokes of a piston dosing pump.

In the theory of this invention there is no feedback of the compressed air volume. This is omitted in favor of an open steering circle, whereby a defined compressed air volume is aligned to each position of the steering. Then too, however, the amount of compressed air is matched to the amount of concrete in such a way that on one hand minimizes the fine dust, on the other hand achieves the lowest amount of compressed air necessary for the application and compression of the concrete.

For better understanding, the invention is explained in more detail in the following, in light of the drawings, which describe several forms of the invention.

Figure 2:
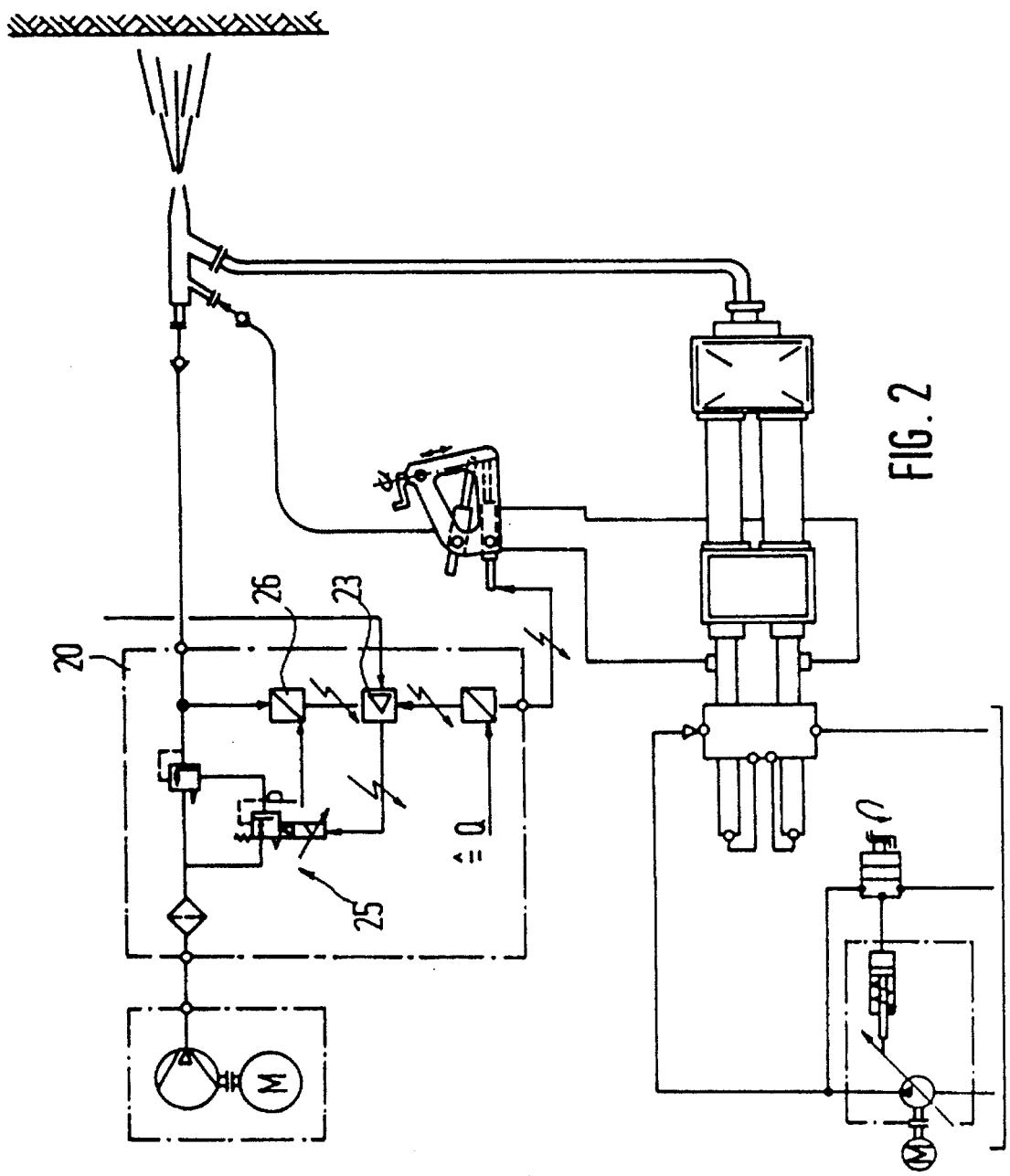
Figure 3:
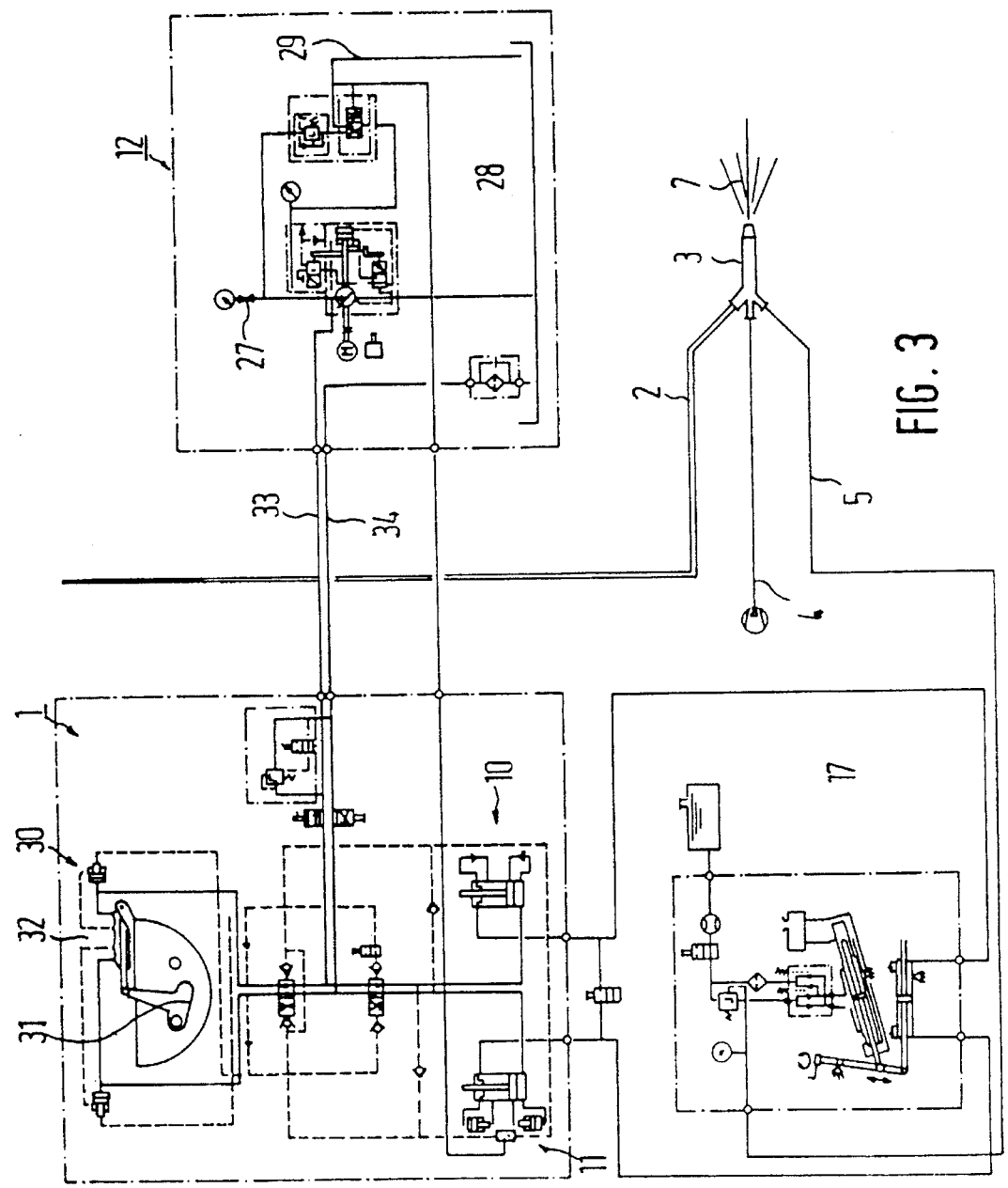
Figure 4:
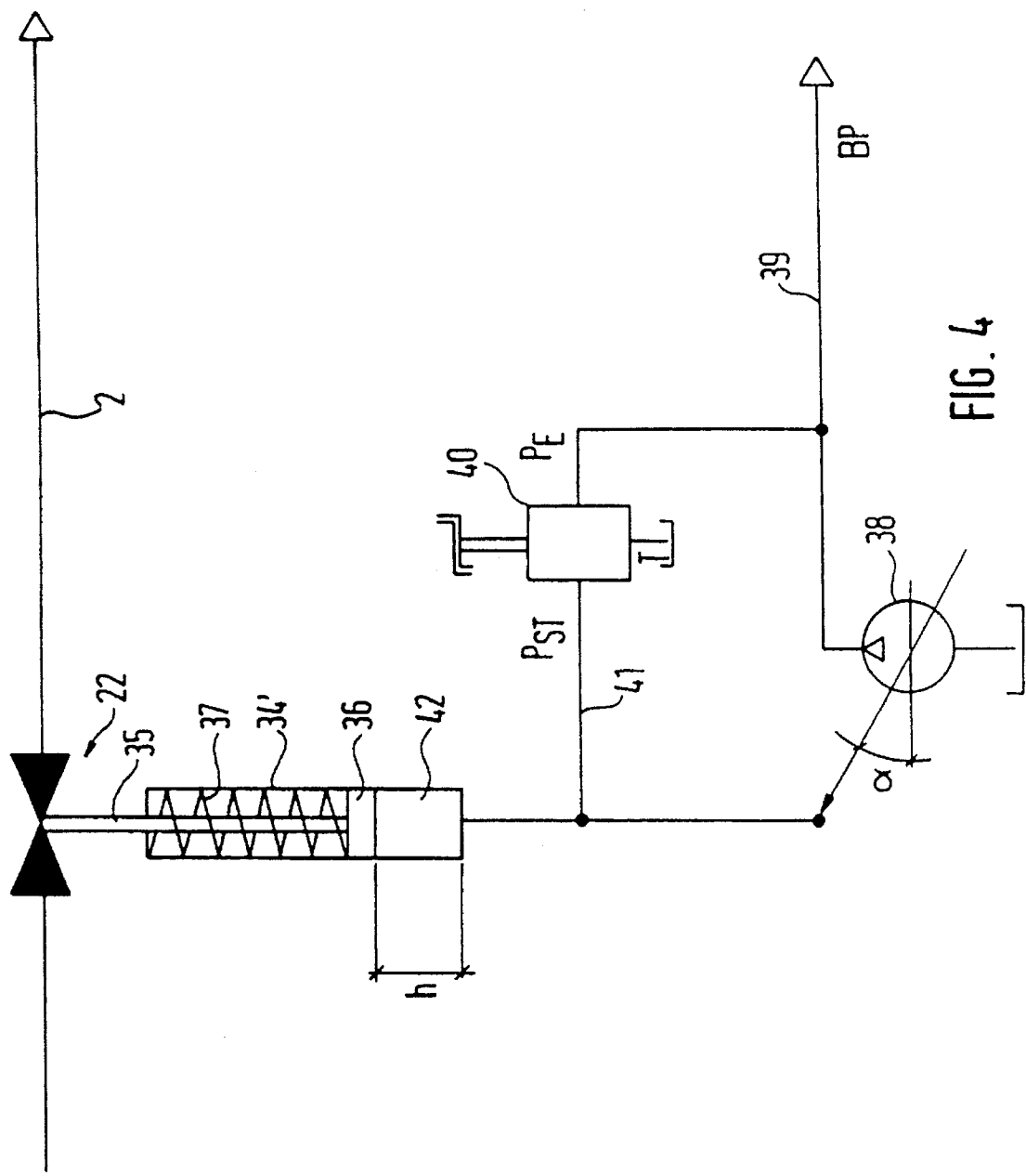

FIG. 1: shows a circuit diagram of a first model of the invention;

FIG. 2: shows a further model of the invention in representation corresponding to FIG. 1;

FIG. 3: shows a circuit diagram of the hydraulic two-cylinder pump to be used within the framework of the invention; and FIG. 4: an execution according to an altered proposed solution of the invention.

According to the representation of FIG. 1, standard concrete is pumped with assistance of a concrete pump (1) through a delivery line (2) to a mixing jet (3) in the wet spraying procedure described. In the mixing jet, compressed air from a hose (4) and hardening accelerant (5) are mixed into the concrete stream before it leaves the jet (3). With help of the jet (3) the mixture is applied to a mountain surface (6) and compressed there. The jet spray is shown as (7).

According to the model shown, the concrete pump is a two-cylinder concrete piston pump. Accordingly it has two concrete delivery cylinders (8,9), which pull the ready mixed concrete from a filling container (43) and press reciprocally in the line (2). The pistons in the delivery cylinders (8,9) are hydraulically powered. The pistons are connected resistant to pressure and tension proof with piston rods from hydraulic impulse cylinders that have a double effect. From the pressure source (12) (only partially shown), the impulse cylinders (10,11) receive the hydraulic form of pressure from a control (14). In the pressure source the impulse motor ($M_1$) is coupled with a shaft with the piston pump that serves to produce pressure. The swivel angle of the piston pump is adjusted over an auxiliary cylinder (15) at (16).

In FIG. 3 the concrete pump is shown in more detail. The hydraulic pressure source (12) is equipped with a pressure measurement apparatus (27) and an automatic swivel arrangement (28) for the hydraulic pump. The control at (29) provides for a perfect, that is, sufficiently great volume in case only a small quantity of the form of pressure is taken from the impulse cylinders (10,11) of the concrete pump (1). At (30) is shown the controlling slide (31), housed in the filling container (43) to control the concrete supply, with its double functioning linear drive (32). It is controlled in dependence on the supply strokes in the cylinders (8,9). Incidentally the concrete pump is connected with the pressure source via the lines (33,34).

According to FIG. 1, the control of a dosing pump (17) for hardening accelerant derives from the impulse cylinders (10,11). With the aid of the control (18), the volume flow of the dosing pump (17), which goes through the line (5) into the jet (3) can be altered and thereby adjusted to the flow of concrete.

The compressed air necessary for the procedure is pressed into the line (4) by a compressed air producer. According to the representation in FIG. 1, the compressor rests on a shaft of the impulse motor ($M_2$).

In FIGS. 1 and 2, a control (20) is connected to the dosing pump (17). The control regulating section is indicated by the dotted closed line. Since the dosing pump (17) is adjusted to the concrete flow in the line (2) through the measuring off of the impulse cylinders (10,11), in the electronic regulating section the volume stream in the line (2) is repeated at (21).

A shut-off and throttle organ (22) is set by the regulator according to the desired value at (23). As shown in FIG. 1, the volume stream is measured behind the throttle organ (22) at (24) and fed back to the regulator (23). The measurement of the volume stream is possible before the throttle organ as well.

In operation, the relationship of the amount of compressed air mixed in per unit of time to the amount of concrete pumped per unit of time is adjusted correspondingly to a desired value that corresponds to the smallest fine dust yield when applying concrete to the surface (6); this is accomplished by the regulating section (21), in which the volume of the concrete pump forms the standard volume for the quantity regulation of the compressed air flowing to the mixing jet (3).

The volume of the concrete pump may be determined from one of the concrete pump auxiliary systems. These auxiliary systems may include the hardening accelerant dosing pump (17); the concrete pump controlling slide (31) which controls the feed of concrete to the pump cylinders from filling container (43); the linear drive (32) for the controlling slide (31); and the concrete pump hydraulic drive. More particularly, the hydraulic drive has a swivel angle (a) which relates to the hydraulic drive pressure and is controlled through a hydraulic controller (15, 16 and. 40).

The model in FIG. 2 is differentiated from that of FIG. 1 by the form of the regulating section (21). Here the pressure is measured behind the adjusting part (25) of the regulating section at (26) and fed back to the regulator (23).

Not pictured in FIG. 3 is a regulator, which controls the amount of compressed air that goes through the line (4) into the jet (3); the regulator is dependent upon the movements of the slide (31) per unit of time, that is, the strokes in the linear drive.

In the representation of FIG. 4, there is a regulator in which, according to the model represented, the shut-off and throttle organ (22) has a hydraulic impetus cylinder (34') to move a slide. To the slide is attached the piston rod (35), the piston of which (36) is supported by a spiral spring (37), that normally presses the spring into the open position. The piston stroke designated (h) is a measure for the throttling of the volume stream flowing through the line (2) in the time unit.

The swivel angle (a) of the pump (38) of the pressure source depends on the hydraulic pressure in the control line. This regulating pressure ($P_{ST}$) is determined by a regulating pressure adjusting valve (40), fed by the entrance pressure ($P_E$).

The regulating pressure ($P_{ST}$) proceeds via the line (41) on one hand to the pump (38) of the pressure source and effects there the adjustment of the swivel angle (a) and on the other hand proceeds to the piston space (42) of the cylinder (34') and there effects the adjustment of the size (h), on which depends the relationship of the amount of compressed air arising at the jet per unit of time to the quantity of concrete pumped per unit of time, proportionally, or proportionally integrally. This assumes that the pressure in the line (39) is also a measure for the quantity of concrete supplied. In this case as well the volume stream in the line (2) corresponds to the smallest yield of fine dust in the application of the concrete.

Deviating from the models of the invention pictured and described above, the speed of the piston rods of the hydraulic drive cylinders (10,11) can determine the standard volume that is supplied to the regulator (20).

We claim:

1. A concrete pump assembly for the wet spraying process, in which concrete is pumped to a mixing jet and is applied to a surface through the mixing jet with compressed air whereby a concrete dust yield is produced, the improvement comprising a regulator having:

first means for monitoring an amount of concrete pumped; and second means responsive to said first means for regulating an amount of compressed air flowing to said mixing jet in such a way that a resulting relationship of said amount of compressed air to said amount of concrete pumped reduces the dust yield when the concrete is applied.

2. The concrete pump assembly according to claim 1 further including at least one auxiliary system, said amount of concrete pumped being determinable from said auxiliary system, and wherein said first means monitors said auxiliary system for determining said amount of concrete pumped.

3. The concrete pump assembly according to claim 1, wherein said pump is a two-cylinder piston pump having a slide that serves to steer a concrete supply and said first means monitors said slide for determining said amount of concrete pumped per a unit of time.

4. The concrete pump assembly according to claim 1 wherein said pump is a piston pump and said first means monitors a number of piston strokes per a unit of time for determining said amount of concrete pumped per said unit of time.

5. The concrete pump assembly according to claim 1 wherein said pump is a hydraulically driven pump and said first means monitors a hydraulic drive for said pump to determine said amount of concrete pumped per a unit of time.

6. The concrete pump assembly according to claim 1 wherein said pump is a hydraulically driven pump and said first means monitors a hydraulic drive pressure for determining said amount of concrete pumped per a unit of time.

7. The concrete pump assembly according to claim 5, wherein said hydraulic drive includes an adjustable pump and said first means is indexed to an adjustment of said adjustable pump for determining said amount of concrete pumped per said unit of time.

8. The concrete pump assembly according to claim 1 further including a dosing pump for a liquid hardening accelerant and wherein said first means monitors said dosing pump for determining said amount of concrete pumped per a unit of time.

9. A concrete pump assembly for the wet spraying process, in which a concrete stream is pumped to a mixing jet and is applied to a surface through the mixing jet with compressed air whereby a concrete fine just yield is produced, the improvement comprising a compressed air shut-off and throttle valve device having means for measuring said concrete stream, said valve device thereby being responsive to said concrete stream in such a way that an amount of compressed air mixed in with said concrete stream to reduce the yield of fine dust in the application of the concrete.

10. The concrete pump assembly according to claim 9, wherein said pump is hydraulically driven and said means for measuring said concrete stream is operatively connected with said hydraulic drive.

11. The concrete pump assembly according to claim 10, wherein said hydraulic drive includes an adjustable swivel plate hydraulic pump for generating a hydraulic pressure to drive said concrete pump, said swivel plate having an adjustment angle corresponding to a hydraulic pressure generated by said hydraulic pump, and wherein said means for measuring said concrete stream is operatively connected with said hydraulic pressure generated.

* * * * *

UNITED STATES PATENT AND TRADEMARK OFFICE
CERTIFICATE OF CORRECTION

PATENT NO. : 5,580,166
DATED : December 3, 1996
INVENTOR(S) : Schmittchen et al.

It is certified that error appears in the above-indentified patent and that said Letters Patent is hereby corrected as shown below:

Col. 3, lines 23-24, delete "This execution of the invention is given in claim 5."

Signed and Sealed this

Twenty-fourth Day of June, 1997

Attest:

Attesting Officer

BRUCE LEHMAN

Commissioner of Patents and Trademarks